United States Patent Office 3,832,202
Patented Aug. 27, 1974

3,832,202
LIQUID SILICA SOURCE FOR SEMICONDUCTORS

Kim Ritchie, Phoenix, Ariz., assignor to
Motorola, Inc., Franklin Park, Ill.

No Drawing. Filed Aug. 8, 1972, Ser. No. 278,833
Int. Cl. C09k 3/00
U.S. Cl. 106—287 SE 6 Claims

ABSTRACT OF THE DISCLOSURE

There is disclosed a liquid silica source for semiconductor diffusions which comprises in combination 54–64% ethyl alcohol, 11–21% ethyl acetate, 13–63% tetraethylorthosilicate, and 3–10% water and 1–8% vinyl trichlorosilane, said percentages being by weight. The liquid silica source may be readily coated onto the semiconductor wafer either by painting, spraying or preferably spinning.

BACKGROUND OF THE INVENTION

This invention relates to a silica coating source and more particularly to a spin-on silica source for semiconductor production.

A spin-on silica source is a liquid which may be formed as a thin layer on a semiconductor wafer utilizing a standard photoresist spinner which source when heated, transforms into a glassy film. Liquid silica sources have previously been suggested to replace the sputter or chemically deposited glasses commonly used. These early suggestions met with mixed success because of the problems of surface damage, non-uniformity, shelf life, and other problems. Thus, it has been generally more customary to use sputter deposition in spite of the requirements for longer time cycles and higher temperatures. It has been theoretically apparent that a liquid silica source would provide more reproducibility, more economy, and higher yields.

Accordingly, it is an object of the invention to provide an improved liquid silica source solution which will overcome the deficiencies of the prior art.

It is a further object of the invention to provide an improved liquid silica source solution which will coat and/or passivate semiconductor devices and method of formulating same.

SUMMARY OF THE INVENTION

In accordance with the invention, there is provided a method of formulating a liquid dopant source comprising the steps of mixing ethyl alcohol of about 44% by weight and ethyl acetate of about 48% by weight with a vinyl trichlorosilane of about 8% by weight. These three ingredients are reacted until the reaction thereof is essentially complete. Generally this takes in the order of about one-half hour. Following filtering of the reacted ingredients, a solution consisting of 68% by weight of ethyl alcohol, approximately 8% by weight of distilled deionized water, and approximately 28% by weight of tetraethylorthosilicate is added to the reacted solution. The ratio of the solution added to the reacted solution is between 1.5 and 2.5 and preferably 2.

The above results in a liquid doping source comprising ingredients, in combination by weight 59% ethyl alcohol, 16% ethyl acetate, 18% tetraethylorthosilicate, 5% water, and 2% vinyl trichlorosilane.

COMPLETE DESCRIPTION

Silica or silicate glass films have been used for various purposes in semiconductor devices, such as: insulation between multilayer metallizations; for contouring steps in oxides or metals for improved step coverage; preventives for auto doping; back-filling of packages; and diffusion masks. In all of the aforementioned usages, it is important that the glassy layer not only positively accomplish its purpose but the process for the formation of the layer should not result in damage or defect increase to the wafer. Since most of the processes by which the silica or silicate layers are formed involve relatively high temperatures, a low temperature silica source has been sought by the semiconductor industry. Thus, in accordance with the invention, there is provided a liquid silica source which may be coated on the appropriate area of the semiconductor device by painting, spraying or spinning at a slightly elevated temperature which results in a drying of the liquid is sufficient to form an adherent glassy film on the device. The liquid silica source consists essentially of a solution of 54–64% ethyl alcohol, 18–21% ethyl acetate, 13–23% tetraethylorthosilicate, 1–8% vinyl trichlorosilane, and 3–10% water, all of the said percentages being by weight.

The foregoing percentages are derived essentially from the constituents utilized in the preparation of the solution, and the true chemical composition of the resultant solution is not readily determinable. It must be recognized that the foregoing composition is generalized, and the mere mixing of the aforementioned ingredients together does not result in an usable liquid silica source for semiconductor purposes.

The desirable liquid silica source in accordance with the invention is prepared by forming two solutions which are then mixed together for utilization and coating of semiconductor devices. Thus, the method of formulating the liquid silica source first comprises the steps of mixing together ethyl alcohol of approximately 44% by weight, and ethyl acetate of approximately 48% by weight with approximately 8% trichlorosilane. These three ingredients are then reacted until the reaction thereof is essentially complete. The reaction apparently taking place between the trichlorosilane and the ethyl alcohol. Generally, this requires in the order of about one-half hour. The resulting solution is filtered through ordinary ash-free filter paper at essentially room temperature.

To the reacted material is then added a second solution. The second solution consists essentially of 68% by weight ethyl alcohol, approximately 8% by weight distilled deionized water, and approximately 28% by weight tetraethylorthosilicate. Preferably, two parts of the second solution are added for one part of the reacted solution; but the ratio may be between 1.5 and 2.5. In preparing the second mixture, these does not appear to be any reaction between the ethyl alcohol, the deionized water and the tetraethylorthosilicate so that alternatively the aforementioned ingredients may be added to the reacted solution in sequence rather than as a second solution. However, it is preferred that the latter be prepared as a second solution rather than being added separately. The combination of all of the ingredients is then stirred and filtered through a fine membraneous filter such as a 1.2 micron millipore filter.

The filtering following the react step is intended to remove any particulate matter; for example, particles of silica may result from the reaction between the ethyl alcohol, the ethyl acetate and the trichlorosilane. And, similarly, the final filtering step is intended to remove any remaining particulate matter which could be the result of the reaction between ingredients or merely formed subject matter.

Glycerol in amounts up to approximately 6% may be used to control the viscosity of the solution so that it will spread into a coherent film when spun on the surface of a semiconductor device. In some instances, depending upon the viscosity desired, the glycerol may be eliminated. In any case, the glycerol would be added as a part of the second solution if desired.

Similarly, the resultant solution may be diluted by appropriate additions of methyl or ethyl alcohol.

It has been found that the liquid silica source solution in accordance with the invention has many novel and advantageous uses. For example, in one discrete transistor application using gold bonding pads, it was found that protection against electrolysis between the gold bonding pads was required to prevent ultimate shorting of the bonding pads. A coating with the subject silica source readily eliminated this problem, whether placed over the bonding pads before bonding thereto or subsequent to the bonding step. Similarly, the silica source has been successfully utilized in the elimination of step discontinuities in integrated circuits. A layer, one quarter micron thick, on III–V compound semiconductor such as light-emitting diodes has been demonstrated as showing excellent adhesion providing hermetic protection for the surface of the LED's while providing a suitable index of refraction to improve the transmissibility of the light emitted from the diode junction. The liquid silica source may similarly contain small amounts of boron or phosphorous to provide doped passivation layers where desired which may be formulated as set forth in copending application Ser. No. 278,896, filed Aug. 9, 1972 and now U.S. Pat. No. 3,789,023, granted Jan. 29, 1974.

In one use found for the liquid silica source which is relatively unexplained, the material has been utilized to cover the transparent leads for liquid crystal displays. A similar silica layer derived by the prior art chemical vapor deposition results in a layer of silica which permits only AC operation of the liquid crystal display; however, the silica layer derived by utilization of the solution in accordance with the invention permits DC as well as AC operation of the liquid crystal display. The mechanism permitting this operation is unknown.

From the above, it will be seen that there has been provided a new and novel liquid silica source for semiconductor applications which demonstrates vast advantages over that provided by the prior art. While the invention has been disclosed by way of the preferred embodiment thereof, it will be appreciated that suitable modifications may be made therein without departing from the spirit and scope of the invention.

What is claimed is:

1. The method of forming a liquid silica source solution comprising the steps of:

(a) providing the ingredients of approximately 44 percent by weight ethyl alcohol, 48 percent ethyl acetate and 8 percent vinyl trichlorosilane;

(b) reacting said ingredients of ethyl alcohol, ethyl acetate and vinyl trichlorosilane for about 30 minutes until the reaction thereof is essentially complete;

(c) filtering the resultant solution; and (d) adding to said reacted ingredients the solution comprising approximately 68 percent ethyl alcohol, 0 to 6 percent by weight glycerol, 8 percent water, and 28 percent of tetraethylorthosilicate in a ratio to reacted solution of between 1.5:2.5.

2. The method of claim 1 wherein the filtering is through ash-free filter paper.

3. The method of claim 1 including the steps of finally filtering the solution after all of the ingredients are added.

4. The method of claim 3 wherein the final filtering is through a millipore filter.

5. The method of claim 1 wherein said water is distilled and deionized before use.

6. A liquid silica source solution for semiconductors produced by the method of claim 1.

References Cited

UNITED STATES PATENTS

| | | | |
|---|---|---|---|
| 3,597,252 | 8/1971 | Schröder et al. | 65—Digest 14 |
| 3,681,132 | 8/1972 | Pammer et al. | 117—201 |
| 3,615,943 | 10/1971 | Genser | 117—201 |

ALLAN LIEBERMAN, Primary Examiner

U.S. Cl. X.R.

65—Digest 14; 106—287 SB; 117—201